April 17, 1951     M. C. POTTER     2,549,334
MOTOR ALTERNATOR CONTROL SYSTEM
Filed March 17, 1950     3 Sheets-Sheet 1

INVENTOR
Manley C. Potter.

Patented Apr. 17, 1951

2,549,334

UNITED STATES PATENT OFFICE 2,549,334

MOTOR ALTERNATOR CONTROL SYSTEM

Manley C. Potter, Turtle Creek, Pa., assignor to Westinghouse Electric Corporation, East Pittsburgh, Pa., a corporation of Pennsylvania Application March 17, 1950, Serial No. 150,295

8 Claims. (Cl. 322—4)

My invention relates, generally, to control systems, and, more particularly, to systems for controlling the operation of motor-alternators which receive power from a direct current source which may be momentarily interrupted, as by a third-rail gap in a subway system, and deliver alternating current power to fluorescent lamps and other apparatus.

An object of my invention is to simplify and improve the machines and the control system described in the copending application of H. W. Graybrook and M. C. Potter Serial No. 150,224, filed March 17, 1950.

Another object of my invention is to eliminate certain field windings from the machines of a motor-alternator set of the type described in the aforesaid copending application without adversely affecting the operation of the machines.

A further object of my invention is to reduce the amount of energy required to be stored in the flywheel of the motor-alternator set.

A more general object of my invention is to provide a control system for a motor-alternator which shall be simple and efficient in operation and which may be economically manufactured and installed.

Other objects of my invention will be explained fully hereinafter or will be apparent to those skilled in the art.

In accordance with one embodiment of my invention, the motor of a motor-alternator set is immediately disconnected from the line when power is interrupted, as by a third-rail gap. The generator has only one field winding which is energized from the car battery, thereby making it unnecessary for the motor to act as a generator during the coasting period. Thus, the energy stored in the flywheel of the set is available for driving the generator to supply the lighting load.

For a better understanding of the nature and objects of the invention, reference may be had to the following detailed description, taken in conjunction with the accompanying drawings, in which.

Figure 1:
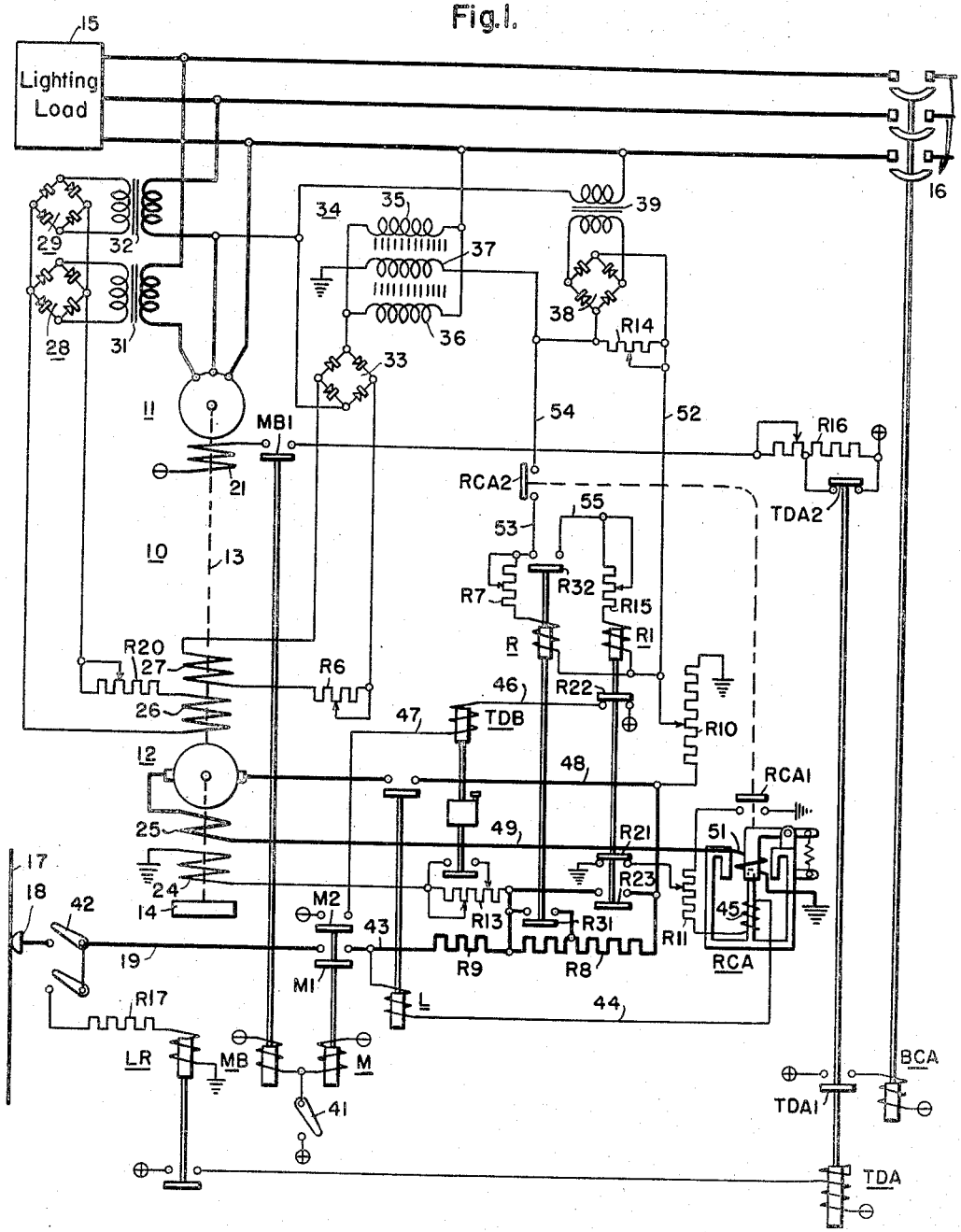
Figure 1 is a diagrammatic view of a control system embodying the principal features of the invention.

Referring to the drawings, and particularly to Fig. 1, the system shown therein comprises a motor-alternator set 10 which, in turn, comprises an alternating current generator 11 driven by a direct current motor 12 through a shaft 13 to which a flywheel 14 is connected. The motor-alternator set 10 may be of the same general type as the motor-generator set disclosed in Patent No. 2,349,618 issued May 23, 1944, to H. W. Graybrook and C. J. Biscup or the motor-alternator set disclosed in a copending application of H. W. Graybrook and M. C. Potter Serial No. 150,224, filed March 17, 1950. In the present application certain of the field windings of the machines shown in the previous applications are omitted and the control system is modified, as will be described more fully hereinafter.

The alternating current generator 11 is utilized to supply alternating current to a lighting load 15 and through conductors 16 to an auxiliary load. Since the lighting load is composed primarily of fluorescent lamps, it is necessary to maintain the generator voltage substantially constant in order to prevent flickering of the lamps.

The power for operating the direct current motor 12 may be supplied through a third rail 17 which is engaged by a current collector 18. It is the usual practice in third-rail systems to sectionalize the system by providing gaps in the third rail at certain intervals. Thus, it is necessary to maintain the voltage of the generator while crossing a third-rail gap in order to prevent dimming of the lamps. In order to do this the energy stored in the flywheel 14 is utilized to drive the motor-generator set while crossing a third-rail gap. I have provided control means for disconnecting the motor from a power conductor 19 and for increasing the excitation of the generator during the coasting period, thereby maintaining a substantially constant generator voltage.

As shown, the alternator 11 is provided with a field winding 21 which is energized from a separate source of excitation, such as a battery or other suitable power source. A variable resistor R16 is provided for adjusting the exciting current in the field winding 21. The motor 12 is provided with a main field winding 24, an interpole field winding 25, a differential field winding 26 and a cumulative field winding 27. During normal operation, the main field winding 24 of the motor 12 is energized from the same power source which energizes the armature winding of the motor. A variable resistor R13 is provided for adjusting the current in the field winding 24.

In order to compensate for the tendency of the motor speed to drop with an increase in the generator load, the differential field winding 26 of the motor 12 is energized through rectifiers 28 and 29 which, in turn, are energized by means of current transformers 31 and 32, respectively, the primary windings of which are connected in the load circuit for the generator 11. A variable resistor R20 is provided for adjusting the current in the field winding 26.

Also, in order to compensate for changes in the voltage of the direct current source which would affect the speed of the motor and the voltage of the generator, the cumulative field winding 27 of the motor is energized through a rectifier 33 which, in turn, is energized through a saturable reactor 34 having alternating current windings 35 and 36 connected to the generator load circuit and a direct current winding 37 connected to a rectifier 38.

As described in the aforesaid Patent No. 2,349,618, the rectifier 38 is energized through a voltage transformer 39 which is connected across one of the phase voltages of the generator 11. The output voltage of the rectifier 38 is utilized in opposition to the voltage of the direct current power source to energize the saturation controlling winding 37 of the rectifier 34. The voltage obtained from the direct current power source may be adjusted by means of a potentiometer resistor R10. This resistor may be adjusted to apply a certain voltage to the rectifier 38 and the saturating winding 37 when the line voltage is normal.

As described in the aforesaid patent, fluctuations from the normal voltage are compensated for by the reactor 34 which controls the energization of the rectifier 33, thereby controlling the excitation of the field winding 27 of the motor 12. A variable resistor R6 is provided for adjusting the current in the field winding 27. A biasing resistor R14 is connected across terminals of the rectifier 38.

As explained hereinbefore, it is necessary to disconnect the motor 12 from the power conductor 19 when crossing a third-rail gap. This is accomplished by means of a reverse current relay RCA, which controls the operation of a switch L. The relay RCA also controls the operation of switches R and R1, which shunt portions of a resistor R8 from the motor circuit after the motor has attained predetermined speeds. The switches R and R1 are so operated that the resistor R8 is reinserted in the motor circuit when the car enters a third-rail gap to prevent flashing of the motor when power is reapplied after the gap is crossed.

A switch M is provided for controlling the application of power to the motor-generator set. A switch MB is provided for connecting the field winding 21 of the generator to the separate source of excitation. The energization of the coils of the switches M and MB may be controlled by a manually operated switch 41. A double-pole manually operated switch 42 may be provided for controlling the energization of the power conductor 19 and also a line relay LR which is responsive to the voltage of the power source.

The contact members of the relay LR control the energization of a time delay relay TDA. The contact members of the relay TDA control the energization of a switch BCA which disconnects the auxiliary load from the generator a predetermined time interval, for example, one second, after the line relay LR opens because of loss of voltage of the power source. A resistor R17 is provided in the circuit for the coil of the line relay LR.

A time delay relay TDB is provided for shunting a portion of the resistor R13 from the circuit for the main field winding 24 of the motor 12 to change the excitation of the motor, as will be explained more fully hereinafter. The energization of the coil of relay TDB is controlled by contact members on the switch M and R1.

In order to operate the motor generator set 10, the manually operated switches 41 and 42 are closed, thereby energizing the switches M and MB from a battery or other suitable control source and the line relay LR from the power source which supplies power through the third rail 17. The closing of the relay LR energizes the time delay relay TDA. The closing of the contact members of the relay TDA energizes the actuating coil of the switch BCA thereby closing the switch to connect the auxiliary load to the generator 11.

The closing of the switch M energizes the coil of the switch L through a circuit which extends from the power conductor 19 through contact members M1, conductor 43, the coil of the switch L, conductor 44, a stationary coil 45 on the relay RCA resistor R11 and contact members R21 to ground. The closing of the switch M also energizes the coil of the relay TDB through a circuit which extends from positive through contact members R22, conductor 46, the coil of the relay TDB, conductor 47 and contact members M2 to negative. The closing of the switch L connects the motor 12 to the power source through a circuit which extends from the power conductor 19 through contact members M1, conductor 43, resistors R9 and R8, conductor 48, the contact members of the switch L, the armature winding of the motor 12, the interpole winding 25, conductor 49 and a moving coil 51 on the relay RCA to ground.

At this time a portion of the resistor R13 is shunted by the contact members of the relay TDB, thereby applying full excitation current to the main field winding 24 of the motor 12. It will be noted that contact members TDA2 of the relay TDA are open at this time, thereby inserting the resistor R16 in the circuit for the field winding 21 of the generator 11, which circuit is established through the contact members MB1 of the switch MB. At this time contact members RCA1 and RCA2 of the reverse current relay are closed.

The motor-alternator set increases its speed until the voltage generated by the generator 11 when transformed by the potential transformer 39 and rectified by the rectifier 38 produces sufficient voltage across the coil of the switch R to operate this switch. The circuit for the coil of the switch R extends from one terminal of the rectifier 38 through conductor 52, the coil of the switch R, resistor R7, conductor 53, contact members RCA2, and conductor 54 to the other terminal of the rectifier 38. The closing of contact members R31 of the switch R shunts a portion of the resistor R8 from the motor armature circuit, thereby increasing the voltage applied to the motor. The closing of contact members R32 establishes a circuit for the actuating coil of the switch R1 which extends from the conductor 52 through the coil of the switch R1, resistor R15, conductor 55 and contact members R32 to the conductor 53, thereby connecting the coil of the switch R1 across the rectifier 38.

When the voltage of the generator 11 reaches a still higher predetermined value the switch R1 is operated to close its contact members R23, thereby shunting the remainder of the resistor R8 from the motor circuit. At this time the contact members R22 of the switch R1 are opened to deenergize the coil of the relay TDB. After a time delay of approximately two seconds the contact members of the relay TDB are opened to insert the resistor R13 in the circuit for the main field winding 24 of the motor 12, thereby decreasing the field strength of the motor which increases the motor speed in a manner well known in the art. The contact members R21 are also opened at this time. However, the coil of the switch L remains energized through the circuit maintained by contact members RCA1 of the reverse current relay RCA.

As explained hereinbefore, the line relay LR is closed whenever third-rail voltage is present at the car. Thus, the relay TDA is closed and the switch BCA is closed to connect the auxiliary load to the generator. The lighting load is also connected to the generator and the fluorescent lamps light when the alternator voltage reaches the proper value.

As also explained hereinbefore, the current transformers 31 and 32 and the rectifiers 28 and 29 function to control the excitation of the differential field winding 26 of the motor 12 to compensate for fluctuations in the load on the generator, thereby maintaining a substantially constant speed of the motor and a substantially constant voltage of the generator. Also, the reactor 34 and the rectifiers 33 and 38 function to compensate for fluctuations in the line voltage applied to the motor by controlling the energization of the cumulative field winding 27 of the motor to maintain a substantially constant motor speed.

The reverse current relay RCA is utilized to secure quick opening of the switch L when the car enters a third rail gap. It is necessary for the switch L to be opened before the line relay LR can open, as the motor 12 acting as a direct current generator would supply voltage to hold the line relay LR closed.

When the car enters a third rail gap, thereby removing the applied voltage from the motor 12, the current in the motor armature and the moving coil 51 of the relay RCA drops to zero, thereby causing the contact members of this relay to open. The opening of the contact members RCA1 interrupts the energizing circuit for the actuating coil of the switch L, thereby causing this switch to open to disconnect the motor 12 from the power conductor 48. The opening of the contact members RCA2 interrupts the energizing circuit for the switches R and R1 which open to reinsert the resistor R8 in the motor circuit to enable the motor to be brought back on the line without flashing after the third-rail gap is crossed.

The closing of the contact members R22 on the switch R energizes the relay TDB, thereby closing its contact members to shunt a portion of the resistor R13 from the circuit for the field winding 24 of the motor. Also, the closing of the contact members R21 establishes a circuit for the coil of the switch L to permit this switch to be reclosed upon the return of line voltage after the third-rail gap is crossed.

As explained hereinbefore, the line relay LR is permitted to open after the switch L opens and this relay will remain open while the car is in the third-rail gap. The relay TDA opens approximately one second after the opening of the contact members of the relay LR, thereby causing the switch BCA to open to disconnect the auxiliary load from the generator.

In this manner the stored energy in the flywheel 14 is preserved for operating the generator to supply the lighting load while the car is in the third-rail gap. The closing of the contact member TDA2 shunts a portion of the resistor R16 from the circuit for the field winding 21 of the generator, thereby increasing the excitation of the generator to maintain its voltage as the speed of the generator decreases.

The foregoing sequence of operation disconnects all the load from the generator except the lighting load one second after entering a third-rail gap. It increases the excitation of the generator to support the generator voltage as the speed decreases. In addition, the starting sequence for the direct current machine as a motor is set up for reapplication of line voltage after the car crosses the third-rail gap.

From the foregoing description of operation it is seen that the motor alternator set is started by means of relays which automatically control its operation. When current from the direct current supply source is interrupted, as by a third-rail gap, the control immediately disconnects the motor from the line and the energy stored in the flywheel operates the generator to supply the lighting load. Since the generator 11 has only one field winding, adjustment of this machine to secure the desired operation is greatly simplified. Furthermore, since the alternator excitation is supplied from a separate source, it is not necessary for the direct current motor to function as a generator to supply the excitation current. Thus, all of the stored energy in the flywheel is available for operating the alternating current generator.

Figure 2:
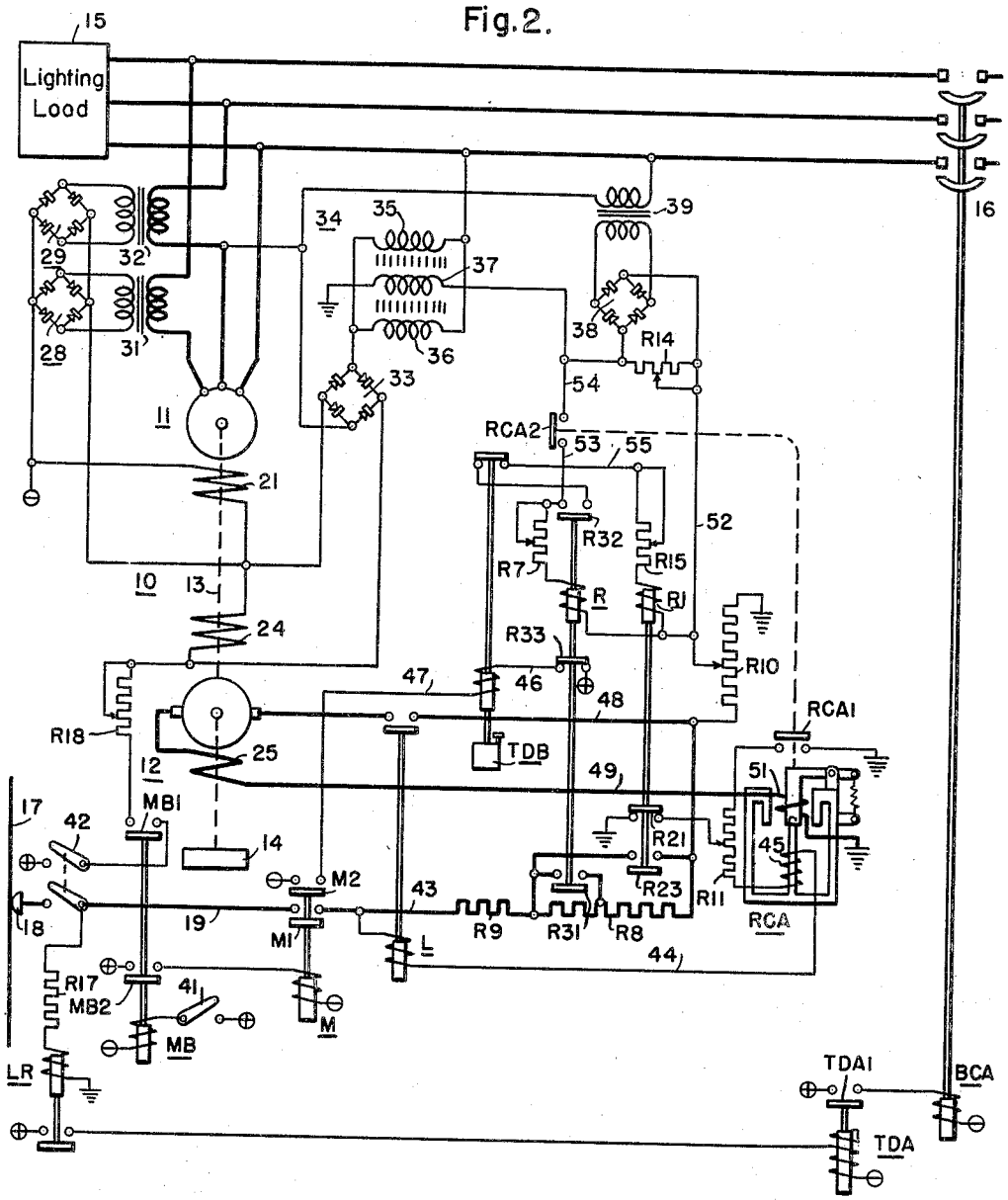
Figure 2 is a diagrammatic view of a modification of the invention.

In the modification of the invention shown in Figure 2, in which like parts are designated by the same reference characters as in Figure 1, the generator 11 is provided with only one field winding 21 and the motor 12 is provided with the main field winding 24 and the interpole winding 25. The field windings 21 and 24 are connected to a separate source of excitation by means of the manually operated switch 42 and contact members MB1 on the switch MB. A variable resistor R18 is provided for adjusting the current in the field windings 24 and 21 which are connected in series-circuit relation.

The relay MB is provided with contact members MB2 which must be closed to establish the energizing circuit for the coil of the switch M which, in turn, controls the application of line voltage to the motor 12. Thus, the field windings of the motor and the generator must be energized before the armature winding of the motor can be energized. The contact members of the relay TDB are utilized to control the energization of the coil of the switch R1, thereby interposing a time delay in the operation of this switch, which will be explained more fully hereinafter.

The compensation for fluctuating direct current voltage and alternating current load is integrated into the single motor and alternator field windings in the present system rather than by varying the current in buck and boost field windings as was done in previous schemes. Thus, an increase in line voltage will increase the voltage applied to the conductor 52 which is connected to the potentiometer resistor R10. The increased voltage at this point causes an increase in the current through the direct current coil 37 of the saturable reactor 34, thereby permitting more alternating current to flow to the rectifier 33 which is connected across the motor field winding 24. The increased rectified current flows through the motor field winding in addition to the battery current formerly flowing through it. This increases the motor excitation, thereby tending to hold the speed constant. The increased IR drop in the motor field winding simultaneously reduces the potential across the alternator field winding, thereby tending to maintain constant alternator voltage. The compensation required to maintain constant motor speed and alternator voltage is directly integrated into the two fields.

In the case of an increase in the generator load, the increased load current flowing through the two current transformers 31 and 32 causes increased rectified current to flow in the alternator field winding 21, thereby tending to maintain the generator voltage. Simultaneously, the increased IR drop through the alternator field 21 decreases the potential across the motor field winding 24 since these two field windings are connected in series-circuit relation. This decreases the motor excitation and, consequently, tends to keep the motor speed constant.

The net effect of changes in the direct current line voltage and the alternating current load is to vary the potential of the point between the motor and the alternator field winding with respect to the applied battery voltage which automatically integrates the proper corrective compensation into both fields.

When the switches 41 and 42 are closed the motor-generator set is started in substantially the same manner as hereinbefore described. The relay TDA controls the operation of the switch BCA to connect the auxiliary load to the generator.

When the car enters a third-rail gap the reverse current relay RCA operates to cause the opening of the switches L, R and R1. These switches disconnect the motor from the line and set up the circuits for reapplication of power when the gap is crossed. Shortly after the switch L opens the line relay LR is opened, thereby deenergizing the coil of the relay TDA. The relay TDA opens in one second, thereby causing the switch BCA to disconnect the auxiliary load from the generator.

The removal of potential from the potentiometer R10 when the switch L opens decreases the saturation of the saturable reactor 34, thereby reducing the alternating current which flows through it and, consequently, the rectified current flowing in the motor field. The reduced IR drop across the motor field winding increases the potential across the generator field winding, thereby tending to maintain the alternating current voltage for fluorescent lamp operation while the generator is being driven by the flywheel 14.

This sequence of operation disconnects all load except the lighting load one second after entering a third-rail gap. When the gap is crossed and line voltage is reapplied the sequence of returning the motor-generator set to the line is the same as during starting from rest with the exception that immediate closing of the switch R1 is prevented if the voltage available is more than necessary to close the switch R1. The two seconds required for the contact members of the relay TDB to close after the deenergization of the coil of this relay by the opening of the contact members R33 on the switch R prevents the closing of the switch R1 immediately after the closing of the switch R. Thus, full line voltage can not be immediately reapplied to the motor 12.

The system shown in Figure 2 has the advantage of eliminating some of the field windings on the motor 12, thereby simplifying the adjustment of this machine. All compensation for direct current line voltage fluctuations and alternating current load variation is integrated directly into both the motor and the alternator fields.

Figure 3:
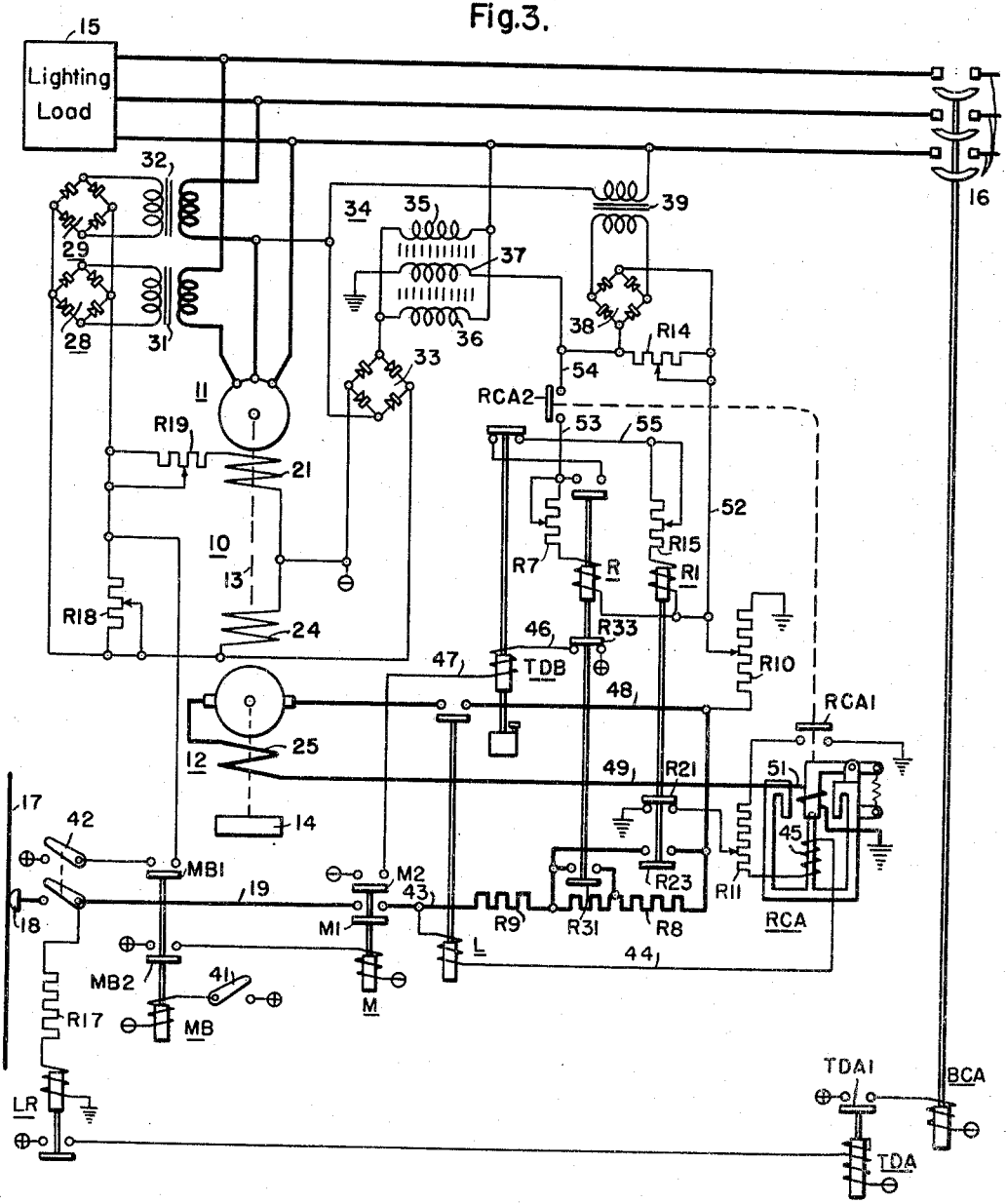
Fig. 3 is a diagrammatic view of another modification of the invention.

The system shown in Figure 3 is similar to the one shown in Figure 2 with the exception that the field winding 21 of the generator 11 and the field winding 24 of the motor 12 are connected to the external source of excitation in parallel-circuit relation instead of in series-circuit relation as in Figure 2. The resistor R18 may be utilized to adjust the current in the field winding 24 and a resistor R19 is provided for adjusting the current in the field winding 21.

The system shown in Figure 3 utilizes the general method of integrating the compensation for direct current line voltage fluctuation and alternating current load variation described in connection with the system shown in Figure 2. However, in the present case the compensating currents are applied only to the motor field winding 24 and the alternating current voltage stability is obtained by relying upon a high degree of saturation in the battery excited field for the generator 11, as was done in the system shown in Figure 1.

The reactor 34 and the rectifier 33 function to compensate for fluctuation in the line voltage by causing current to circulate through the field winding 24 in the manner hereinbefore described. Likewise, the current transformers 31 and 32 and the rectifiers 28 and 29 cause compensating current to flow through the resistor R18 which, in turn, affects the current flowing through the field winding 24 from the external source of excitation to help maintain a constant motor speed and hence a constant generator voltage.

The present system has the advantage of reducing the number of field windings required on the motor and the generator, thereby simplifying their structure and the adjustment of these machines to obtain satisfactory operation. Since the compensation for line voltage fluctuations and generator load variation is applied to the motor field only, the adjustment of the system is greatly simplified. The energy stored in the flywheel 14 may all be utilized to operate the generator 11 while crossing a third-rail gap since the motor 12 is not required to supply excitation current for the generator.

From the foregoing description, it is apparent that I have provided a system for controlling the operation of a motor-alternator set which is greatly simplified and is more easily adjusted than systems previously utilized. Furthermore, the structure of the machines is simplified since a fewer number of field windings is required.

Since numerous changes may be made in the above described construction and different embodiments of the invention may be made without departing from the spirit and scope thereof, it is intended that all matter contained in the foregoing description or shown in the accompanying drawings shall be interpreted as illustrative and not in a limiting sense.

I claim as my invention:

1. In a control system, in combination, a direct current motor having an armature winding and a field winding, an alternating current generator having an armature winding and a field winding, a shaft connecting the motor and the generator, a flywheel connected to the shaft, a main load circuit and an auxiliary load circuit for the generator, a first switching means for connecting the auxiliary load circuit to the generator, a direct current power conductor, a second switching means for connecting the motor to the power conductor, a separate source of excitation for the generator field winding, rectifying means for supplying current to the motor field winding from the generator, a reverse current relay responsive to the motor armature current for causing the opening of said second switching means, and relay means responsive to the voltage of the power conductor for causing the opening of said first switching means, said generator being driven by stored energy in said flywheel to supply current to the main load circuit while the motor is disconnected from the power conductor.

2. In a control system, in combination, a direct current motor having an armature winding and a field winding, an alternating current generator having an armature winding and a field winding, a shaft connecting the motor and the generator, a flywheel connected to the shaft, a main load circuit and an auxiliary load circuit for the generator, a first switching means for connecting the auxiliary load circuit to the generator, a direct current power conductor, a second switching means for connecting the motor to the power conductor, a separate source of excitation for the generator field winding, rectifying means for supplying current to the motor field winding from the generator, a reverse current relay responsive to the motor armature current for causing the opening of said second switching means, and time delay relay means for causing the opening of said first switching means after the interruption of power to the motor, said generator being driven by stored energy in said flywheel to supply current to the main load circuit while the motor is disconnected from the power conductor.

3. In a control system, in combination, a direct current motor having an armature winding and a field winding, an alternating current generator having an armature winding and a field winding, a shaft connecting the motor and the generator, a flywheel connected to the shaft, a main load circuit and an auxiliary load circuit for the generator, a first switching means for connecting the auxiliary load circuit to the generator, a direct current power conductor, a second switching means for connecting the motor to the power conductor, a separate source of excitation for the generator field winding, rectifying means for supplying current to the motor field winding from the generator, a reverse current relay responsive to the motor armature current for causing the opening of said second switching means, relay means responsive to the voltage of the power conductor for causing the opening of said first switching means, said generator being driven by stored energy in said flywheel to supply current to the main load circuit while the motor is disconnected from the power conductor, a resistor for controlling the current in the generator field winding, and switching means controlled by said relay means for shunting said resistor.

4. In a control system, in combination, a direct current motor having an armature winding and a field winding, an alternating current generator having an armature winding and a field winding, a shaft connecting the motor and the generator, a flywheel connected to the shaft, a main load circuit and an auxiliary load circuit for the generator, a first switching means for connecting the auxiliary load circuit to the generator, a direct current power conductor, a second switching means for connecting the motor to the power conductor, a separate source of excitation for the generator field winding, rectifying means for supplying current to the motor field winding from the generator, a reverse current relay responsive to the motor armature current for causing the opening of said second switching means, time delay relay means for causing the opening of said first switching means after the interruption of power to the motor, said generator being driven by stored energy in said flywheel to supply current to the main load circuit while the motor is disconnected from the power conductor, a resistor for controlling the current in the generator field winding, and switching means controlled by said time delay relay means for shunting said resistor.

5. In a control system, in combination, a direct current motor having an armature winding and a field winding, an alternating current generator having an armature winding and a field winding, a shaft connecting the motor and the generator, a flywheel connected to the shaft, a main load circuit and an auxiliary load circuit for the generator, a first switching means for connecting the auxiliary load circuit to the generator, a direct current power conductor, a second switching means for connecting the motor to the power conductor, a separate source of excitation for the generator field winding and the motor field winding, rectifying means for supplying current to the generator field winding and the motor field winding from the generator, a reverse current relay responsive to the motor armature current for causing the opening of said second switching means, and relay means responsive to the voltage of the power conductor for causing the opening of said first switching means, said generator being driven by stored energy in said flywheel to supply current to the main load circuit while the motor is disconnected from the power conductor.

6. In a control system, in combination, a direct current motor having an armature winding and a field winding, an alternating current generator having an armature winding and a field winding, a shaft connecting the motor and the generator, a flywheel connected to the shaft, a main load circuit and an auxiliary load circuit for the generator, a first switching means for connecting the auxiliary load circuit to the generator, a direct current power conductor, a second switching means for connecting the motor to the power conductor, a separate source of excitation for the generator field winding and the motor field winding, rectifying means for supplying current to the generator field winding proportional to the generator load current, additional rectifying means for supplying current to the motor field winding proportional to the voltage of the power conductor, a reverse current relay responsive to the motor armature current for causing the opening of said second switching means, and relay means responsive to the voltage of the power conductor for causing the opening of said first switching means, said generator being driven by stored energy in said flywheel to supply current to the main load circuit while the motor is disconnected from the power conductor.

7. In a control system, in combination, a direct current motor having an armature winding and a field winding, an alternating current generator having an armature winding and a field winding, a shaft connecting the motor and the generator, a flywheel connected to the shaft, a main load circuit and an auxiliary load circuit for the generator, a first switching means for connecting the auxiliary load circuit to the generator, a direct current power conductor, a second switching means for connecting the motor to the power conductor, a separate source of excitation for the generator field winding and the motor field winding, said field windings being connected to the separate source in parallel-circuit relation, rectifying means for varying the current in the motor field winding in proportion to the generator load current, additional rectifying means for varying the current in the motor field winding in proportion to the voltage of the power conductor, a reverse current relay responsive to the motor armature current for causing the opening of said second switching means, and relay means responsive to the voltage of the power conductor for causing the opening of said first switching means, said generator being driven by stored energy in said flywheel to supply current to the main load circuit while the motor is disconnected from the power conductor.

8. In a control system, in combination, a direct current motor having an armature winding and a field winding, an alternating current generator having an armature winding and a field winding, a shaft connecting the motor and the generator, a flywheel connected to the shaft, a main load circuit and an auxiliary load circuit for the generator, a first switching means for connecting the auxiliary load circuit to the generator, a direct current power conductor, a second switching means for connecting the motor to the power conductor, a separate source of excitation for the generator field winding and the motor field winding, said field windings being connected to the separate source in parallel-circuit relation, a variable resistor for adjusting the current in the motor field winding, rectifying means connected across said resistor, said rectifying means being energized by current proportional to the generator load current, additional rectifying means for varying the current in the motor field winding in proportion to the voltage of the power conductor, a reverse current relay responsive to the motor armature current for causing the opening of said second switching means, and relay means responsive to the voltage of the power conductor for causing the opening of said first switching means, said generator being driven by stored energy in said flywheel to supply current to the main load circuit while the motor is disconnected from the power conductor.

MANLEY C. POTTER.

No references cited.